United States Patent
Chen

(10) Patent No.: US 7,297,222 B2
(45) Date of Patent: Nov. 20, 2007

(54) METHOD AND DEVICE FOR THE MASK WELDING OF MOVING PLASTIC FILMS BY LASERS

(75) Inventor: Jie-Wei Chen, Alpnach-Dorf (CH)

(73) Assignee: Leister Process Technologies, Sarnen (CH)

( * ) Notice: Subject to any disclaimer, the term of this patent is extended or adjusted under 35 U.S.C. 154(b) by 399 days.

(21) Appl. No.: 10/838,056

(22) Filed: May 3, 2004

(65) Prior Publication Data
US 2004/0231787 A1 Nov. 25, 2004

(30) Foreign Application Priority Data
May 22, 2003 (EP) .................................. 03011613

(51) Int. Cl.
*B29C 65/00* (2006.01)

(52) U.S. Cl. ............................. 156/272.8; 156/275.1; 156/290

(58) Field of Classification Search ............. 156/272.8, 156/272.2, 275.1, 290; 219/121.6
See application file for complete search history.

(56) References Cited

U.S. PATENT DOCUMENTS

| | | | | |
|---|---|---|---|---|
| 4,302,654 A | * | 11/1981 | Bennett et al. | ........ 219/121.71 |
| 2001/0019045 A1 | | 9/2001 | Chen et al. | |
| 2003/0213552 A1 | * | 11/2003 | Chen et al. | .............. 156/272.8 |

* cited by examiner

*Primary Examiner*—Jeff H. Aftergut
*Assistant Examiner*—Daniel McNally
(74) *Attorney, Agent, or Firm*—Bachman & LaPointe, P.C.

(57) ABSTRACT

A method and device allows dynamic mask welding with online position adjustment in the high-speed welding of structured and endless plastic films. By a transparent driven mask roller provided with masks being arranged in a passive pressure roller surrounding the mask roller, detection can take place optically, and the mask roller and consequently the mask are synchronized with the film speed. Adjustment is detached from a film transport mechanism and does not influence the welding process and in this case, above all, the speed. High film transport speeds in the range of up to 1000 mm per second can be employed.

5 Claims, 1 Drawing Sheet

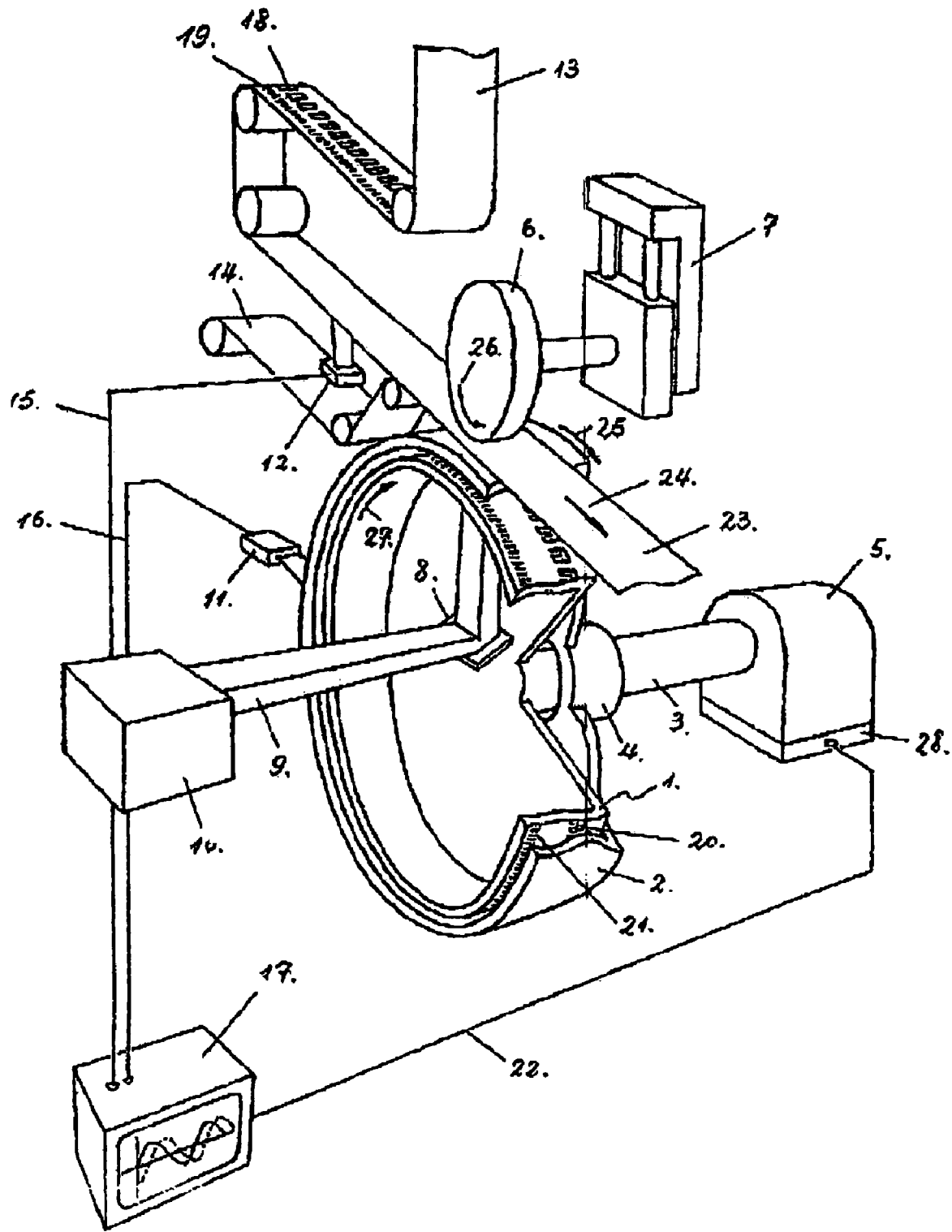

METHOD AND DEVICE FOR THE MASK WELDING OF MOVING PLASTIC FILMS BY LASERS

The present invention relates to a method and a device for the mask welding of moved plastic films by means of laser beams, in which a transparent film is penetrated by the laser beam and is connected to an absorbent film at defined locations.

It is known to connect plastic materials by means of laser beams, in that the upper material facing the laser beam is irradiated by the latter and, at the contact face between the upper material transparent to the laser beam and the lower material impermeable to the laser beam, the two materials are heated and are connected to one another under pressure. The material transparent to the laser beam may, in optical terms, be black within the visible wavelength range. Moreover, it is known, for this purpose, to generate a linear laser beam, a relative movement between the materials and the laser beam taking place during the welding operation, in order to generate the desired welding contour.

A precondition for the welding process according to this irradiation technique is the heat response of the plastic under IR radiation. The plastic pigmented with IR-absorbing substances absorbs the heat energy from the IR source (laser source) under radiation and heats up. The accumulation of the heat energy and the temperature consequently reached in the plastic are dependent on the type of metering of the energy, such as, for example, the energy density and radiation time. Moreover, the material property, such as, for example, the thermal conductivity, is also important. The critical step for the welding process is the phase transition from the solid state into the liquefaction state, said phase transition also being designated below as the fusion temperature. In order to reach this fusion temperature, some heating time is required on account of the low thermal conductivity of the plastic. In principle, it is possible to effect a shortening of the radiation time by means of a correspondingly higher energy dose. However, this measure reduces the process window, with the result that the welding quality may be impaired.

Endless film material may be used, for example, as part of a micromechanical component, sensors, actuators, etc., the film material at the same time being even transport means for the component. Also, endless film material may be used for the packaging of such components transported on a film or on other articles to be packaged. For the production of endless films welded in this way, it is important to carry out a welding operation which is as accurate as possible, but is also rapid.

European Patent application 02 010 925.2 of May 16, 2002, also pending, specifies a method and a device, in which the high welding speed can be achieved for endless plastic films in that the process of preheating of the plastic is integrated due to the special arrangement of the beam former. This takes place, there, by means of two oppositely directed rollers pressing against one another, the first roller being produced from a material permeable to a laser beam and being of tubular design, and a second roller being produced from a material which is easily deformable on the surface. In addition, means for generating at least one laser beam at the contact face are provided in the first roller. The desired welding speed can be achieved there by the adaptation of the beam former. In addition, the desired weld seam structure can be implemented, using a mask which is integrated in one of the rollers. A device of this type is operable only in the event that an exact position of the welding structures on the film is not required.

If, however, the weld seam structures are to be applied exactly only in particular well-defined positions on the film, for example with an accuracy of up to 20 µm, the mask has to be adjusted correspondingly during the welding process. This adjustment must constantly be carried out dynamically and should be fully detached from the film transport system, so that the high-speed welding can be carried out, uninfluenced by the adjustment process, and also speedily without any interruption.

Accordingly, it is an object of the present invention to provide a method wherein weld seam structures can be applied in well-defined positions, within the µm range, to plastic films moving at high speed.

SUMMARY OF THE INVENTION

The foregoing object is achieved by the invention, by providing a method for the mask welding of moved plastic films by means of laser beams, in which a transparent film is penetrated by the laser beam and is connected to an absorbent film at defined locations, in that the laser beam is applied to the films in a welding zone through a mask comoved in synchronism with the films. The invention further includes a device for the mask welding of moved plastic films by means of laser beams, with a laser means and with means for feeding the films into a welding zone, at least one upper pressure roller and one lower pressure roller for pressing together the films at least in the welding zone, wherein the mask is arranged on a mask roller which rotates about the longitudinal axis and the speed of which can be synchronized with the film speed.

BRIEF DESCRIPTION OF THE DRAWINGS

The invention is explained in more detail below by means of an exemplary embodiment, in conjunction with the single figure which shows an embodiment of an arrangement according to the invention.

DETAILED DESCRIPTION

According to the invention, in a welding zone in which the plastic films are connected to one another, the laser beam is applied to the films through a mask which is comoved in synchronism with the films. By welding zone is meant the region in which the linear laser beam impinges onto the film. A pressing together of the films takes place simultaneously in this welding zone. This allows a dynamic adaptation of the mask to the structures to be welded.

According to a preferred embodiment of the method, the mask is arranged so as to be spaced apart from the transparent film and the speed of the mask is set by means of a separate drive. This takes particular account of the dynamic mask adjustment, since this makes it possible to have an online position correction during an uninterrupted film welding process. Production can be ensured with a high throughput, at the same time with a high precision of the mask covering, and with well-defined weld seams.

According to a further embodiment of the method, the mask is synchronized with the film speed, before the welding zone is reached, by means of recognition marks on a film and on a mask carrier. There are various possibilities for this purpose. This may be implemented, for example, by the optical detection of the recognition marks and by corresponding evaluation in a computer, with subsequent regulation of the speed of the mask.

Preferably, the laser beam is applied to the films in the region of the welding zone through a circumferential portion of a mask roller rotating about an axis. The advantage of this is that a corresponding device can be accommodated in the most confined possible space.

After penetrating the mask, the laser beam is applied to the films through a transparent pressure roller rotating at the film speed. This pressure roller may be one which has a specific axis of rotation or the axis of rotation of which corresponds to the axis of rotation of the mask roller. In the case of different axes of rotation, it is possible for the mask roller and the pressure roller to rotate in opposite directions and for them to touch one another on the circumference or else not. However, the preferred embodiment of the method according to the invention with regard to the transparent pressure roller is such that the laser beam is applied to the films through a pressure roller arranged around the mask roller. This may be carried out by means of a pressure roller having the same or a different axis of rotation. Preferably, the optically transparent pressure roller is driven passively by the movement of the film, while the mask roller is controlled by a specific drive system. As a result, the rotation of this roller can be synchronized a hundred percent both with the pressure roller and with the running plastic film. A mask synchronized and corotating with the constantly moving plastic films is thereby obtained. The relative position of the mask structures with respect to the plastic film is determined by the adaptation of the rotational speed of the mask roller.

In the device of an embodiment of the invention, the mask is arranged on a mask roller which rotates about the longitudinal axis and the speed of which can be synchronized with the film speed.

Furthermore, preferably, the mask roller is arranged in one of the pressure rollers, the two axes of rotation being parallel to one another or identical, and the circumference of the mask roller being arranged, at least in the region of the welding zone, at the smallest possible distance from the inner circumference of the pressure roller surrounding the mask roller and transparent to the laser beams. The smallest possible distance must be provided at least in the region of the welding zone, in order to ensure the necessary accuracy in the transfer of the mask to the film. The distance may in this case, at least in this region, be smaller than 1 mm. The extent to which the distance deviates from this value in the remaining region depends on the arrangement of the pressure roller in relation to the mask roller.

In a further embodiment, the mask roller has recognition marks for the optical detection of the speed, and a control means sets the rotational speed of the mask roller as a function of the comparison with the speed of the films. In principle, the film speed may likewise be determined via detection marks, but also solely by means of the rotational speed of drive rollers.

The method and the device according to the invention describe a dynamic mask adjustment method for the welding of endless films by means of a device which can be integrated in a relatively simple way in the device and can be switched on and off, as required. The method is online, that is to say can be used in a directly controllable manner in a one-dimensional high-speed process. The adjustment unit is fully detached from the film transport mechanism and does not influence the welding process and in this case, above all, the speed. It allows high film speeds, and film speeds of 800 mm per second have already been achieved in tests. Higher speeds of up to at least 1000 mm per second appear to be achievable.

With reference to the figure, structures 20 and recognition marks 21 in the form of thin strokes are located on a mask roller 1 which rotates about the drive shaft 3 and is of transparent design. Around the mask roller 1 is arranged a transparent pressure roller 2 which is moved via the roller mounting 4 passively by the movement of the films 13 and 14 to be welded to one another. The mask roller 1 is rotated via the drive shaft 3 by a drive means 5.

In the exemplary embodiment, the film 13 is designed as an absorbent film and the film 14 as a transparent film which are moved in front of a pressure roller 6 which is moveable in the vertical direction and can be pressed with pressure, for example by means of a pressure cylinder 7, against the joined together films 23 and the pressure roller 2. The direction of rotation 26 of the nontransparent pressure roller 6 and the directions of rotation 25, 27 of the corotating pressure roller 2 and mask roller 1 are oppositely directed. The pressure roller 6 is likewise driven passively and has a soft press-on surface, in order, during the welding operation, to provide in the welding zone a longer pressure zone for the films. The direction of movement of the joined together films 23 is indicated by the arrow 24.

On the underside of the absorbent film 13, for example, structures, such as a metallic film, may be located. In addition, it has at the edge recognition marks 19, for example thin strokes. These recognition marks are detected by an optical detection means and are fed via the line 15 to a signal processing unit 17. Correspondingly, the markings 21 and the mask roller 1 are read by an optical detection means 11 and are likewise fed to the signal processing unit 17 via the line 16. The signal processing unit 17 delivers corresponding signals to the drive control 28 via the line 22.

Welding is carried out by means of a laser beam 9 from a laser source 10, a deviation mirror 8 being arranged in the mask roller 1 in order to focus the laser beam onto the desired location. In principle, it is also possible, if necessary, to move the laser beam over a particular region on the film by a moved deflection means.

Synchronization between the mask roller 1 and the plastic films 13, 14 to be welded can be achieved by the detection of the actual position of the plastic film 13 shortly before the welding zone is reached and of the actual position of the mask 20. For this purpose, particular identical recognition marks 19, 21 are applied with a clearly defined period both on the plastic film 13 and on the mask roller 2. This takes place by means of thin strokes in the exemplary embodiment. Other markings familiar to a person skilled in the art are possible. The geometry of these thin strokes is determined by the requirement for adjustment accuracy and by the desired maximum welding speed.

The relative relationships in position between the recognition mark 19 and the useful structure 18 on the film 13 are permanently defined. These recognition marks can be detected quickly and with high accuracy by the optical detectors 11 and 12, for example light barriers. By the comparison of the measurement signals, the information on the relative position between mask 20 and film 13 can be determined and can be used for controlling the rotational speed of the mask roller 1. The adjustment is in this sense the constant correction of the equivalent of the mask roller position. The welding result may be checked by a camera system after welding.

What is claimed is:

1. A method for welding plastic films together comprising:
- providing a transparent endless film;
- providing an absorbent endless film;
- providing a lower pressure roller;
- providing an upper pressure roller;
- providing a mask roller carrying a mask;
- providing a laser beam;
- providing means for driving the mask roller independently from the pressure rollers;
- rotating the mask and pressing the endless films together by the pressure rollers within a welding zone,
- moving the endless films in synchronism with the rotating mask through the welding zone; and
- penetrating the rotating mask and the endless transparent film with the laser beam when the films are in the welding zone, wherein the transparent film is connected to the absorbent film at locations defined by the mask.

2. The method as claimed in claim 1, including arranging the mask roller so as to be spaced apart from the transparent film wherein moving speed of the mask roller is set by separate drive means.

3. The method as claimed in claim 2, including providing recognition marks on the absorbent film and on the mask roller, wherein the movement of the mask roller is synchronized with the movement of the films prior to a defined location reaching the welding zone.

4. The method as claimed in claim 3, wherein the synchronization of the mask roller speed is carried out by a comparison of the recognition marks of the absorbent film and the mask roller and by regulation of rotation speed of the mask.

5. The method as claimed in claim 1, wherein the lower pressure roller is transparent and arranging the mask roller inside the transparent pressure roller, wherein the laser beam is applied to the films through the mask of the mask roller and the transparent pressure roller.

* * * * *